UNITED STATES PATENT OFFICE.

ALBERT E. WOOLF, OF NEW YORK, N. Y., ASSIGNOR TO THOMAS J. MONTGOMERY AND ROSAMOND WOOLF, OF SAME PLACE.

DISINFECTANT AND DEODORIZER.

SPECIFICATION forming part of Letters Patent No. 490,797, dated January 31, 1893.

Application filed December 23, 1892. Serial No. 456,172. (No specimens.)

*To all whom it may concern:*

Be it known that I, ALBERT E. WOOLF, a citizen of the United States, residing at New York, in the county of New York and State of New York, have invented certain new and useful Improvements in Disinfectants and Deodorizers; and I do declare the following to be a full, clear, and exact description of the invention, such as will enable others skilled in the art to which it appertains to make and use the same.

This invention relates to a disinfecting and deodorizing liquid or solution. When a solution of hypochlorite as of sodium is brought in contact with organic matter, a decomposition at once takes place. While it is impossible to state just what the reaction would be, it is probably as follows: Part of the chlorine in the hypochlorite replaces a part or the whole of the hydrogen in the organic substance; another portion unites with the liberated hydrogen, and ozone is produced, which, in its turn, acts on the organic matter. In other words, the organic material, be it organized as in the lower forms of vegetable life (viz., bacteria &c.) or non-organized, as in the solid or suspended matter of sewage, is decomposed, and if sufficient hypochlorite be present, the organic matter is permanently disinfected.

The object of the invention is to provide a disinfecting and deodorizing liquid or solution, containing the necessary elements and compounds or constituents for quickly and thoroughly disinfecting vessels, sewage, rooms or premises, and which can be quickly prepared and used on a large scale at a comparatively small expense.

My disinfecting liquid is composed of a watery solution containing free chlorine, chlorides and hypochlorites of sodium and magnesium, free or nascent oxygen and ozone, and, if desired, other oxidizing agents. The constituents are united in suitable proportions in water to form a solution of the desired strength, and the strength of such solution may be varied for different applications or uses of the disinfectant.

My disinfecting and deodorizing solution will contain the constituents in substantially the proportions stated below: Water one gallon chlorides (alkaline and earthy) 896.08 grains hypochlorites as of sodium and magnesium 391.0 grains available chlorine 186.32 free oxygen and ozone in any desired proportions.

My disinfecting fluid or liquor containing the valuable oxidizing constituents above named, can be quickly prepared on a large scale, and has proved very effective for deodorizing and purifying large bodies of infectious and other matter.

The disinfecting liquor may be readily applied to garbage offal, clothing and other material; or be mixed with sewage, thereby purifying it. It may also be applied to walls, ceilings and floors of buildings, cellars, ships, &c. thereby thoroughly disinfecting them.

This disinfecting fluid or liquor may be prepared in a closed vessel, so as to confine and retain all of the oxidizing gases and vapors, and the liquor may be put up for the trade in suitable bottles, casks or barrels, ready for use upon delivery to the consumer.

Having thus described my invention, what I claim and desire to secure by Letters Patent is:

A disinfecting and deodorizing solution containing chlorine, chlorides, hypochlorites, free oxygen and ozone in suitable proportions, substantially as described.

In testimony whereof I affix my signature in presence of two witnesses.

ALBERT E. WOOLF.

Witnesses:
E. M. DAWSON,
E. B. CLARK.